US009807492B1

(12) United States Patent
Campbell

(10) Patent No.: US 9,807,492 B1
(45) Date of Patent: Oct. 31, 2017

(54) SYSTEM AND/OR METHOD FOR ENHANCING HEARING USING A CAMERA MODULE, PROCESSOR AND/OR AUDIO INPUT AND/OR OUTPUT DEVICES

(71) Applicant: Ambarella, Inc., Santa Clara, CA (US)

(72) Inventor: Jeffery Campbell, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 237 days.

(21) Appl. No.: 14/267,119

(22) Filed: May 1, 2014

(51) Int. Cl.
| H04R 1/10 | (2006.01) |
| G10L 15/25 | (2013.01) |
| G10L 21/0208 | (2013.01) |
| G02C 11/06 | (2006.01) |
| H04N 5/232 | (2006.01) |
| G02B 27/01 | (2006.01) |
| H04N 5/225 | (2006.01) |
| G06K 9/00 | (2006.01) |
| G10L 21/0272 | (2013.01) |

(52) U.S. Cl.
CPC ............. *H04R 1/105* (2013.01); *G02C 11/06* (2013.01); *G10L 15/25* (2013.01); *G10L 21/0208* (2013.01); *H04N 5/2251* (2013.01); *H04N 5/23219* (2013.01); *H04R 1/1083* (2013.01); *G02B 2027/0178* (2013.01); *G06K 9/00221* (2013.01); *G10L 21/0272* (2013.01)

(58) Field of Classification Search
CPC combination set(s) only.
See application file for complete search history.

(56) References Cited

U.S. PATENT DOCUMENTS

| 7,246,058 | B2 | 7/2007 | Burnett | 704/226 |
| 7,383,181 | B2 | 6/2008 | Huang et al. | 704/231 |
| 7,433,484 | B2 | 10/2008 | Asseily et al. | 381/355 |
| 8,019,091 | B2 | 9/2011 | Burnett et al. | 381/71.8 |
| 8,340,309 | B2 | 12/2012 | Burnett et al. | 381/71.6 |
| 8,467,543 | B2 | 6/2013 | Burnett et al. | 381/94.1 |
| 8,503,686 | B2 | 8/2013 | Jing et al. | 381/71.1 |
| 2008/0317261 | A1* | 12/2008 | Yoshida | H04R 3/04 381/94.1 |
| 2010/0106707 | A1* | 4/2010 | Brown | G06F 17/30793 707/711 |
| 2012/0212499 | A1* | 8/2012 | Haddick | G02B 27/0093 345/589 |
| 2013/0342457 | A1 | 12/2013 | Cox et al. | 345/158 |
| 2013/0342981 | A1 | 12/2013 | Cox et al. | 361/679.01 |
| 2014/0204245 | A1* | 7/2014 | Wexler | H04N 5/23222 348/231.99 |

(Continued)

*Primary Examiner* — Twyler Haskins
*Assistant Examiner* — Akshay Trehan
(74) *Attorney, Agent, or Firm* — Christopher P. Maiorana, PC

(57) ABSTRACT

An apparatus comprising a camera, a microphone, a speaker and a processor. The camera may be mounted to a first portion of a pair of eyeglasses. The microphone may be mounted to a second portion of the pair of eyeglasses. The speaker may be mounted to the pair of eyeglasses. The processor may be electronically connected to the camera, the microphone and the speaker. The processor may be configured to (i) associate a visual display of the movement of the lips of a target received from the camera with an audio portion of the target received from the microphone, (ii) filter sounds not related to the target, and (iii) play sounds not filtered through the speaker.

20 Claims, 11 Drawing Sheets

(56) References Cited

U.S. PATENT DOCUMENTS

| | | | |
|---|---|---|---|
| 2014/0223279 A1* | 8/2014 | Algreatly | G06T 11/00 715/233 |
| 2014/0267642 A1* | 9/2014 | Wexler | G09B 21/006 348/62 |
| 2015/0110285 A1* | 4/2015 | Censo | B60Q 5/006 381/71.4 |
| 2015/0112671 A1* | 4/2015 | Johnston | H04R 3/005 704/233 |

* cited by examiner

SYSTEM AND/OR METHOD FOR ENHANCING HEARING USING A CAMERA MODULE, PROCESSOR AND/OR AUDIO INPUT AND/OR OUTPUT DEVICES

FIELD OF THE INVENTION

The present invention relates to hearing enhancement devices generally and, more particularly, to a system and/or method for enhancing hearing using a camera module, processor and/or audio input and/or output devices.

BACKGROUND OF THE INVENTION

With populations aging and wearable technology gaining popularity, an opportunity exists for solving common hearing problems for a wide group of individuals. Enhancing the ability to hear would be useful as a person ages.

It would be desirable to implement a hearing enhancement device that uses a combination of cameras and/or microphones.

It would also be desirable to implement a system and/or method for enhancing hearing using a camera module, processor and/or audio input and/or output devices.

SUMMARY OF THE INVENTION

The present invention concerns an apparatus comprising a camera, a microphone, a speaker and a processor. The camera may be mounted to a first portion of a pair of eyeglasses. The microphone may be mounted to a second portion of the pair of eyeglasses. The speaker may be mounted to the pair of eyeglasses. The processor may be electronically connected to the camera, the microphone and the speaker. The processor may be configured to (i) associate a visual display of the movement of the lips of a target received from the camera with an audio portion of the target received from the microphone, (ii) filter sounds not related to the target, and (iii) play sounds not filtered through the speaker.

The objects, features and advantages of the present invention include providing a hearing enhancement device that may (i) use a combination of camera and/or microphone inputs, (ii) cancel noises not related to a target, (iii) build a database of faces associated with certain frequencies, (iv) enhance audio frequencies associated with talking faces, (v) sample background noise when no talking faces are detected, (vi) monitor particular frequency ranges based on a gender of the talking faces, (vii) associate audio frequencies with the wearer of the device, and/or (viii) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Wearable camera devices are often effective when worn on the head of a user pointing in the direction of the face of the user. Embodiments of the invention include a wearable device that accommodates a speaker and/or microphone system tuned for voice frequencies. The camera device may supplement hearing in an intelligent manner and/or allow users to more easily understand voice communication of other people in close proximity. The camera device may be used in environments with high levels of ambient noise.

Figure 1:
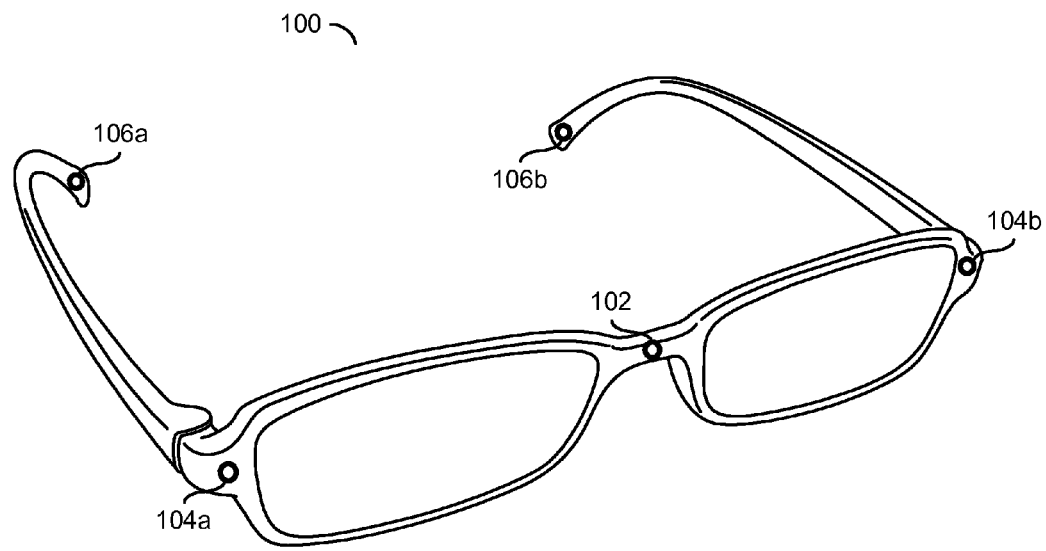
FIG. 1 is a diagram of a device.

Referring to FIG. 1, a block diagram of a device 100 is shown in accordance with an embodiment of the invention. The device 100 is shown in a basic form. The device generally comprises a camera 102, a microphone 104, and a speaker 106. In one example, the microphone 104 may be implemented as a microphone 104a and a microphone 104b. The microphone 104a and the microphone 140b may operate as a stereo pair. In one example, the speaker 106 may be implemented as a speaker 106a and a speaker 106b. The speaker 106a and the speaker 106b may operate as a stereo pair.

The microphones 104a-104b may provide separation that may improve results. The microphones 104a-104b may be used in conjunction with talking (or speech) detection (to be described in connection with FIGS. 3-7) to determine and/or isolate a person of interest in close proximity from other sources of sound. The stereo pair of microphones 104a-104b may be used to locate the talking face. For example, if the microphone on the right side of the device 100 (e.g., the microphone 104a) samples a higher amplitude of sound than the microphone on the left side of the device 100 (e.g., the microphone 104b) then the speaker on the right side of the device 100 (e.g., the speaker 106a) may play back a higher amplitude of the sampled sound than the speaker on the left side of the device 100 (e.g., the speaker 106b). The camera 102 may include module (or processor) that has DSP capabilities (to be described in more detail in connection with FIG. 2). The processor may analyze audio waveforms and/or differentiate different frequencies. The processor may implement face, mouth/lips (talking), and/or gender/age detection hardware.

Figure 2:
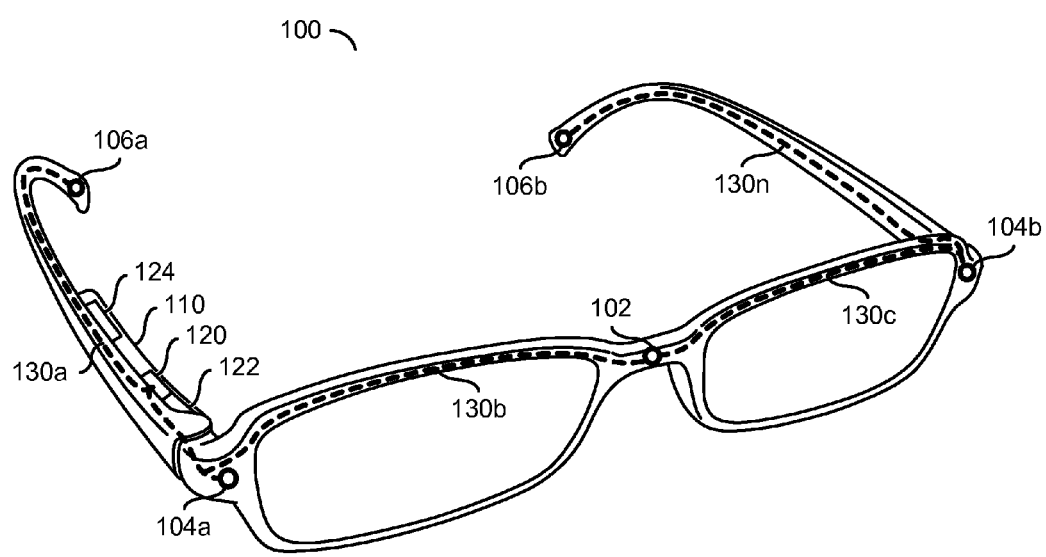
FIG. 2 is a diagram of the device of FIG. 1 showing interconnections.

Referring to FIG. 2, a diagram illustrating connectivity between the camera 102, the microphones 104a-104b, and the speakers 106a-106b is shown. A number of wires 130a-130n and are shown. A wire 130a is shown connected between the microphone 104a and the speaker 106a. A wire 130b is shown connected between the microphone 104a and the camera 102. A wire 130c is shown connected between the camera 102 and the microphone 104b. A wire 130n is shown connected between the microphone 104b and the speaker 106b.

The wires 130a-130n are shown in a generally serial configuration. However, a multi-wire system may be implemented. The wire 130a is shown connected to a compartment 110. The compartment 110 may hold a processor 120, a memory 122, and a communication circuit 124. In one example, the processor 120 may include the memory 122. In another example, the memory 122 may be a component separate from the processor 120. The memory 122 may be implemented as a computer readable medium containing processor executable instructions configured to perform various steps. The processor 120 may include digital signal processing (DSP) capabilities.

The memory 122 may be a persistent storage device such as NAND and/or NOR flash memory. The memory 122 may store data for a long period of time. The memory 122 may store a database of entries of targets comprising face data, gender/age data, and/or associated frequency data. The memory 122 may have a limited storage capacity. For example, a number of entries in the database stored in the memory 122 may be periodically purged.

The communication circuit 124 may implement communication using a wireless protocol. For example, the communication circuit 124 may implement GPS communication. In another example, the communication circuit 124 may be implemented as an onboard component capable of wireless communication. In another example, the communication circuit 124 may be implemented as a component capable of communicating (e.g., using Bluetooth, ZigBee, etc.) with a device in close proximity (e.g., a smart phone, a tablet, etc.). The device 100 may leverage the communication and/or other capabilities of the device in close proximity. The particular communication protocol implemented may be varied according to the design criteria of a particular implementation.

Figure 3:
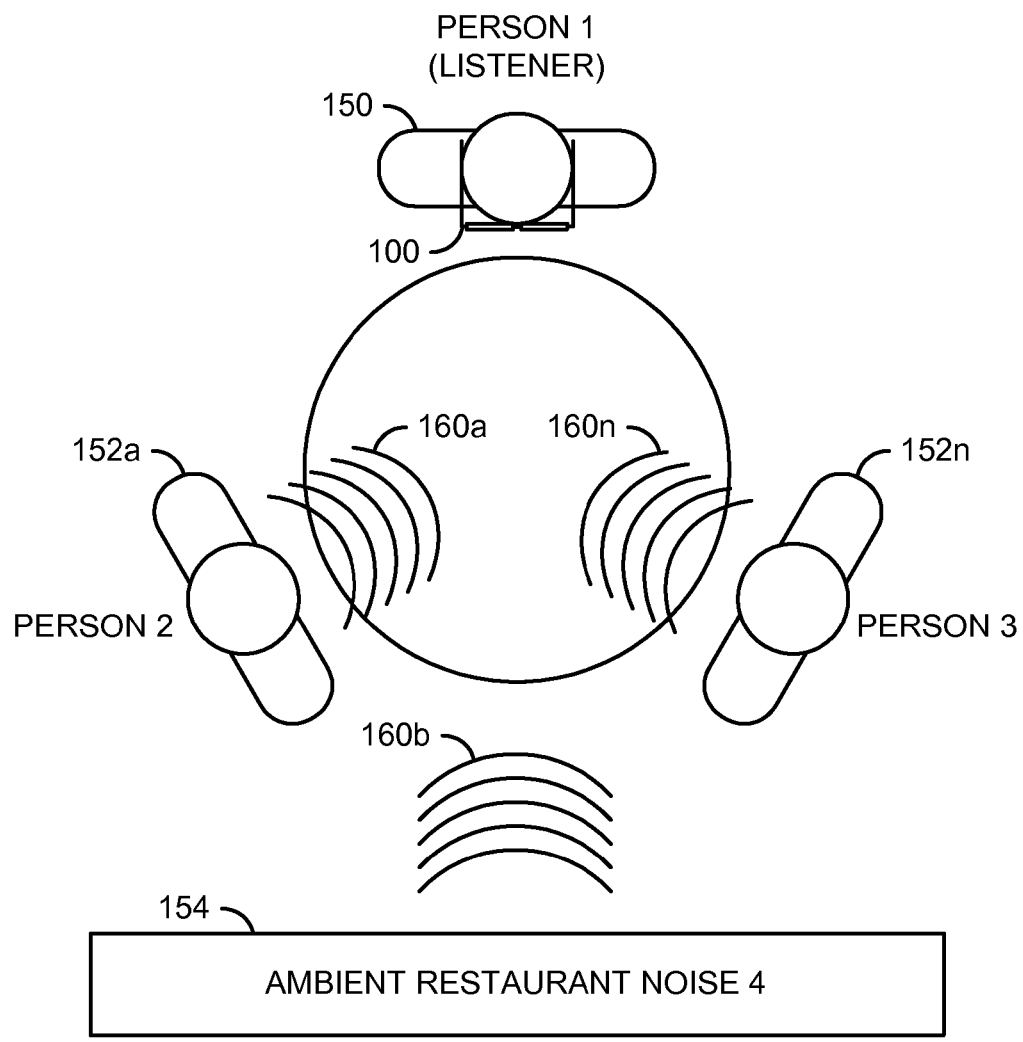
FIG. 3 is a context diagram of the device of FIG. 1.

Referring to FIG. 3, a top view of a common scenario where the device 100 will be useful is shown. A person 150 (e.g., a listener) is shown. The listener 150 may be a wearer of the device 100. A number of people 152a-152n are shown. A source of ambient noise 154 is also shown. The person 152a (e.g., person 2) is shown projecting a sound 160a. Similarly, the person 152n (e.g., person 3) is shown projecting a sound 160n. The source 154 is shown projecting a sound 160b. The person 150 may be using the device 100. The person 150 may receive the sound sources 160a-160n. Often crowded restaurants have a high level of background (or ambient) noise that the human brain needs to filter to focus on the specific frequencies of the guests in close proximity across a table or a short distance away.

Figure 4:
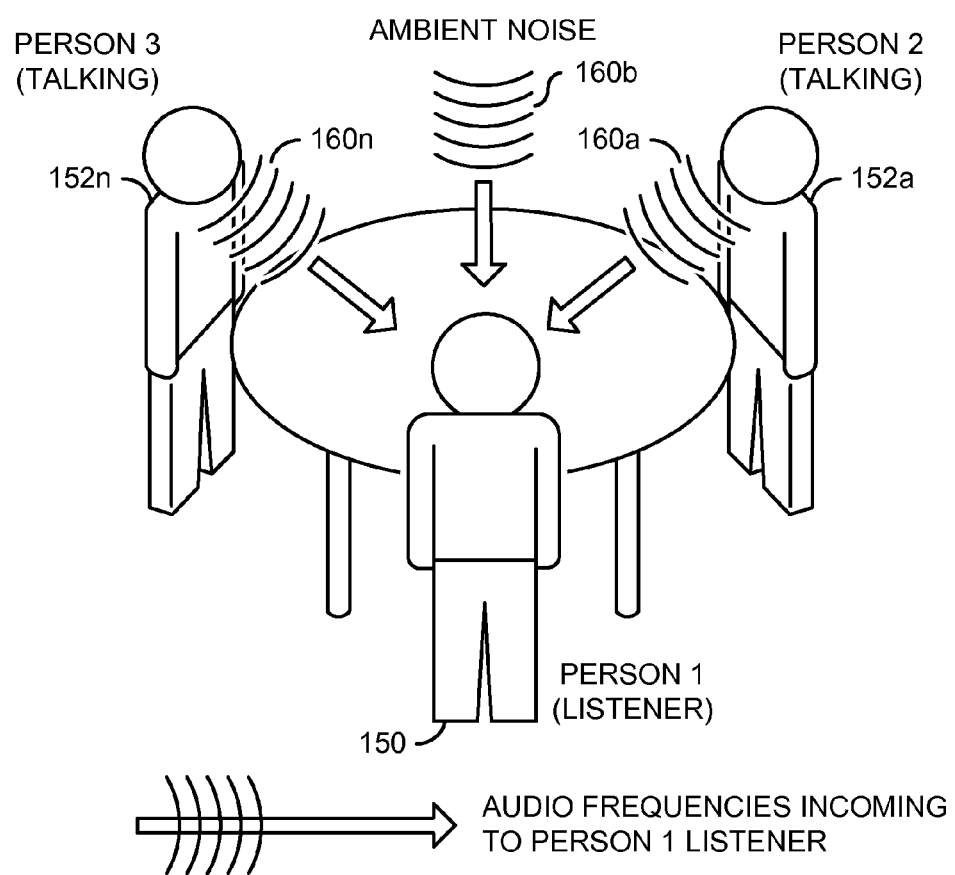
FIG. 4 is a context diagram of the device of FIG. 1.

Referring to FIG. 4, a common scenario from the perspective of a user is shown. The sound sources 160a-160n are shown. For example, the field of view (FOV) of the user may not encompass both the person 152a and the person 152n simultaneously. Presumably when one individual is talking, the user 150 would turn his or her head and the FOV of the head mounted camera module 102 may detect the talking mouth of the particular person 152a-152n. Over time, the system 100 would learn the audio frequencies of the sounds 160a-160n projected by each talking mouth and/or ambient noise source. The frequencies may be stored for a short period (e.g., in the memory 122) to build confidence the frequencies incoming can be adequately separated from the ambient noise conditions. In another example, the FOV of the user may encompass both the person 152a and the person 152n simultaneously. The system 100 may learn the audio frequencies associated with one of and/or both the person 152a and the person 152n.

Generally, the user 150 is able to turn his or her attention to the different individuals 152a-152n at the table. For example, the system 100 would recognize that the face and talking mouth are different and create a separate entry in the database. In another example, the user 150 may turn his or her attention to more than one of the different individuals 152a-152n at the same time. Generally, in normal conversation, each person may take turns speaking. The system 100 may amplify and/or enhance the audio from each of the faces in the FOV of the camera 102. Over time the system will successfully separate ambient noise and hold a reliable database of face/talking mouth frequency data that would be put into use by actively canceling the ambient noise and amplifying or otherwise enhancing the frequencies of the talking mouth in the FOV or in close proximity.

Figure 5:
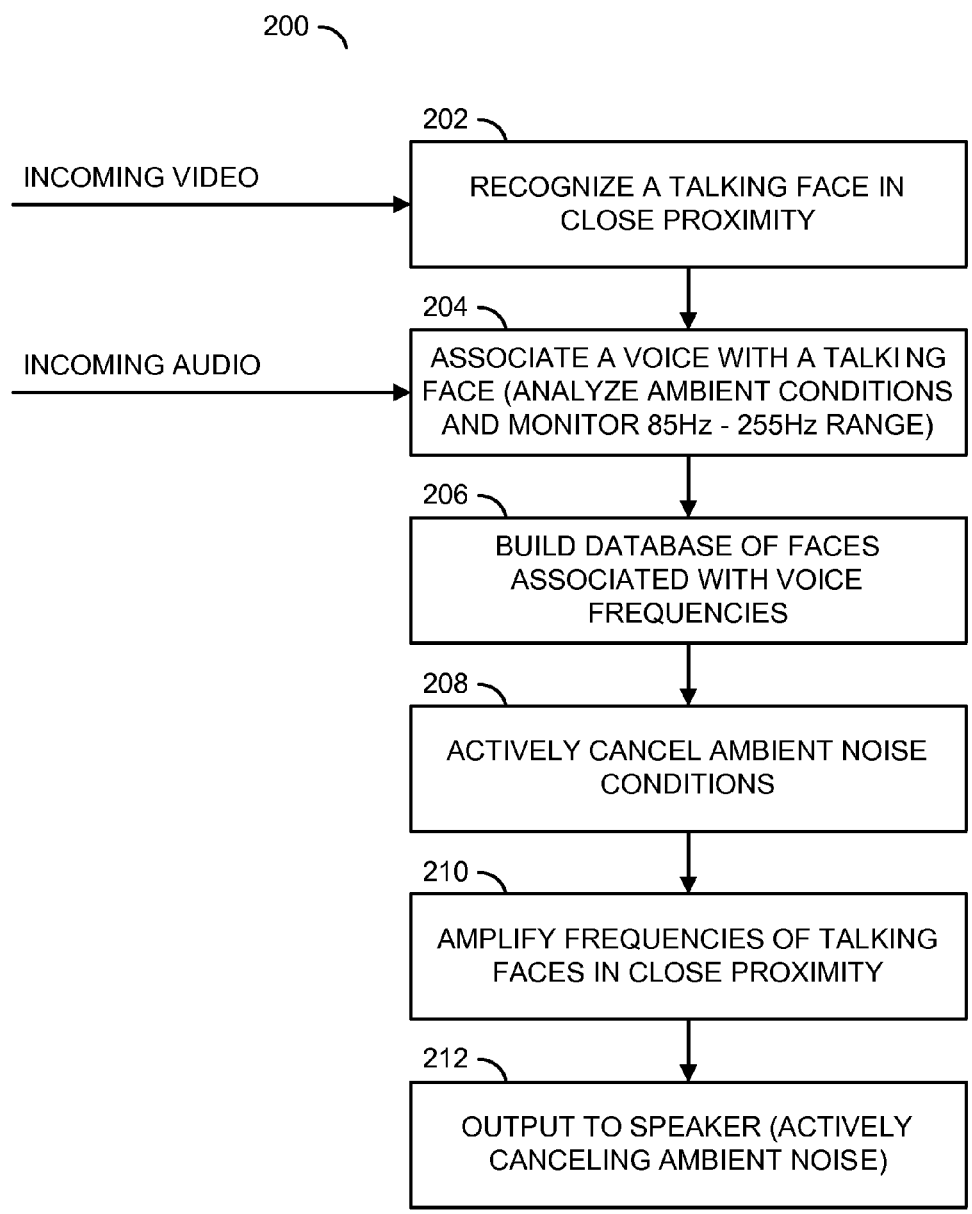
FIG. 5 is a flow diagram of an embodiment.

Referring to FIG. 5, a block diagram of a method (or process) 200 is shown. The method 200 may be used to show a chain (e.g., from video/audio input to building the database) to actively remove ambient noise and/or amplify/enhance guest audio frequencies. The method 200 generally comprises a block (or circuit) 202, a block (or circuit) 204, a block (or circuit) 206, a block (or circuit) 208, a block (or circuit) 210, and a block (or circuit) 212. The block 202 may receive an incoming video signal (e.g., a video signal from the camera 102). The block 202 may recognize a talking face in close proximity. The block 204 may receive an incoming audio signal (e.g., an audio signal from the microphones 104a-104b). The block 204 may associate a voice with a talking face by analyzing ambient conditions and monitoring the 85 Hz-255 Hz audio frequency range (e.g., the audio frequency range generally associated with human speech). Other frequencies may be monitored based on characteristics of the face (e.g., the age, gender, etc.)

The processor 120 may determine voice data by analyzing the frequency range of the incoming audio signal. The block 204 may analyze ambient conditions. The block 206 may build the database of faces associated with voice frequencies. The database may be stored in the memory 122. The block 208 may actively cancel ambient noise conditions. The block 210 may amplify and/or enhance frequencies of the talking faces in close proximity. The block 212 may present an output to a speaker (e.g., the speakers 106a-106b) to actively cancel ambient noise.

Figure 6:
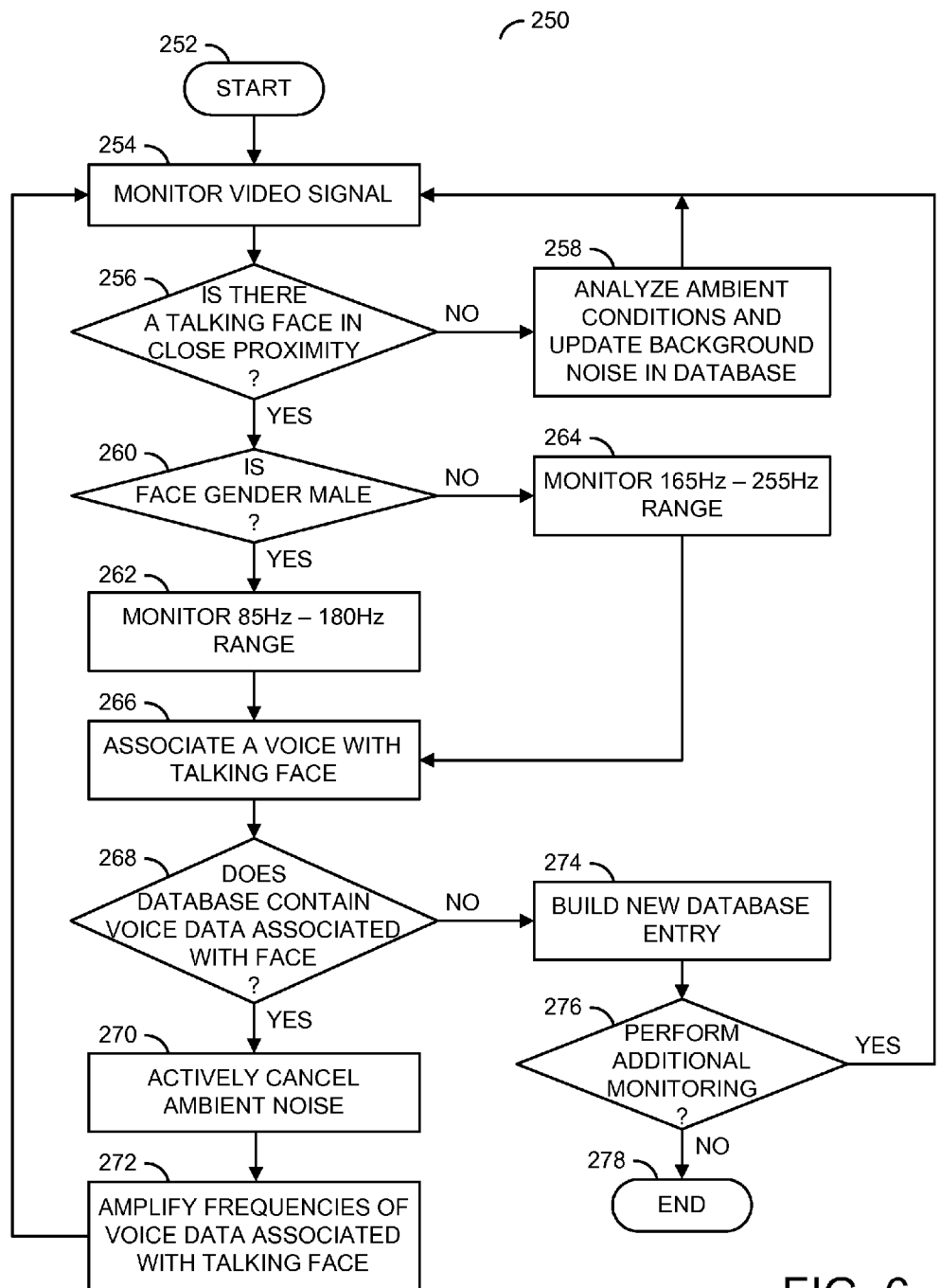
FIG. 6 is a flow diagram illustrating amplifying and/or enhancing frequencies of voice data associated with a talking face.

Referring to FIG. 6, a flow diagram illustrating a method (or process) 250 is shown. The method 250 may implement amplifying and/or enhancing frequencies of voice data associated with a talking face. The method 250 generally comprises a step (or state) 252, a step (or state) 254, a decision step (or state) 256, a step (or state) 258, a decision step (or state) 260, a step (or state) 262, a step (or state) 264, a step (or state) 266, a decision step (or state) 268, a step (or state) 270, a step (or state) 272, a step (or state) 274, a decision step (or state) 276, and a step (or state) 278.

The state 252 may start the method 250. Next, the state 254 may monitor a video signal (e.g., a video signal from the camera 102). Next, the method 250 moves to the decision state 256. If the decision state 256 determines there is not a talking face in close proximity, the method 250 moves to the state 258. The state 258 may analyze ambient conditions and update background noise in the database. Next, the method 250 returns to the state 254. If the decision state 256 determines there is a talking face in close proximity, the method 250 moves to the decision state 260.

If the decision state 260 determines the face gender is male, the method 250 moves to the state 262. The state 262 may monitor the 85 Hz-180 Hz audio frequency range (e.g., the audio frequency range typically associated with the adult male voice). The audio to be monitored may be received by the microphones 104a-104b. Next, the method 250 moves to the state 266. If the decision state 260 determines the face gender is not male, the method 250 moves to the state 264. The state 264 may monitor the 165 Hz-255 Hz audio frequency range (e.g., the audio frequency range typically associated with the adult female voice). The audio to be monitored may be received by the microphones 104a-104b. Next, the method 250 moves to the state 266. The state 266 may associate a voice with the talking face. Next, the method 250 moves to the decision state 268.

If the decision state 268 determines the database does contain voice data associated with the face, the method 250 moves to the state 270. The state 270 may actively cancel ambient noise. Next, the state 272 may amplify and/or enhance the audio frequencies of voice data associated with the talking face. Next, the method 250 returns to the state 254. If the decision state 268 determines the database does not contain voice data associated with the face, the method 250 moves to the state 274. The state 274 may build a new database entry (as described in connection with FIG. 7). Next, the method 250 moves to the decision state 276. If the decision state 276 determines additional monitoring should be performed, the method 250 returns to the state 254. If not, the method 250 moves to the state 278, which ends the method 250.

The audio signal may be received by the microphones 104a-104b. The video signal/visual display may be received by the camera module 102. Stereo video input may be implemented to determine objects in close proximity by separating the objects in close proximity from the background video. The processor 120 may analyze the received video signal and/or the received audio signal. The analysis of the received audio and/or video signals may be compared to entries stored in the database. The database may be stored in the memory 122. The processor 120 may amplify/enhance the audio frequencies associated with the talking faces. The processor may actively cancel the audio frequencies associated with ambient/background noise. The enhanced/amplified audio may be played back through the speakers 106a-106b.

Figure 7:
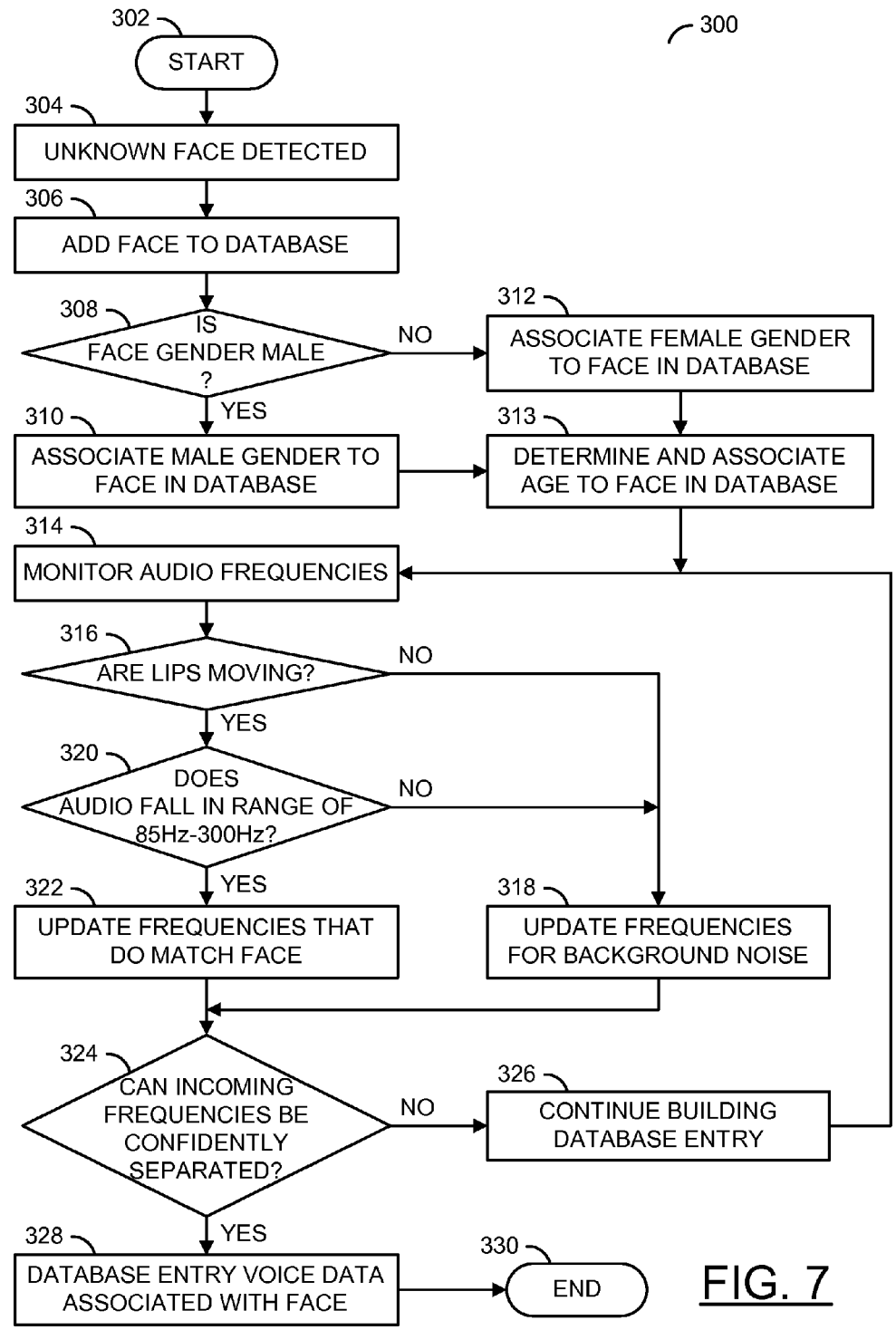
FIG. 7 is a flow diagram illustrating adding a face to a database.

Referring to FIG. 7, a flow diagram illustrating a method (or process) 300 is shown. The method 300 may implement adding a face to the database. The method 300 generally comprises a step (or state) 302, a step (or state) 304, a step (or state) 306, a decision step (or state) 308, a step (or state) 310, a step (or state) 312, a step (or state) 313, a step (or state) 314, a decision step (or state) 316, a step (or state) 318, a decision step (or state) 320, a step (or state) 322, a decision step (or state) 324, a step (or state) 326, a step (or state) 328, and a step (or state) 330.

The state 302 may start the method 300. Next, the state 304 may detect an unknown face. The state 306 may add the face to the database. The face data may include information about the mouth/lip movement of the unknown face. Next, the method 300 moves to the decision state 308. If the decision state 308 determines the face gender is male, the method 300 moves to the state 310. The state 310 may associate a male gender to the face in the database. Next, the method 300 moves to the state 313. If the decision state 308 determines the face gender is not male, the method 300 moves to the state 312. The state 312 may associate a female gender to the face in the database. Next, the method 300 moves to the state 313. The state 313 may determine and associate an age to the face in the database. Next, the state 314 may monitor audio frequencies. Next, the method 300 moves to the decision state 316.

If the decision state 316 determines the lips of the face are moving, the method 300 moves to the decision state 320. If not, the method 300 moves to the state 318. The state 318 may update frequencies for background noise. Next, the method 300 moves to the decision state 324. If the decision state 320 determines the audio does not fall in the range of 85 Hz-300 Hz, the method 300 moves to the state 318. If so, the method 300 moves to the state 322. The state 322 may update frequencies that do match the face. Next, the method 300 moves to the decision state 324.

If the decision state 324 determines the incoming frequencies can not be confidently separated, the method 300 moves to the state 326. The state 326 may continue building the database entry. Next, the method 300 may return to the state 314. If the decision state 324 determines the incoming frequencies can be confidently separated, the method 300 moves to the state 328. The state 328 may associate the voice entry of the database with the face. Next, the method 300 moves to the state 330, which ends the method 300.

The device 100 may associate voice data with a new face. Generally, the voice frequencies of males, females, and children exist in a very narrow spectrum. For example, sampling specific frequencies based on a gender of the new face may improve the accuracy of associating voice data with the new face. In another example, the device 100 may detect lip movement of the new face and monitor for audio in a specified range. In yet another example, the device 100 may have an input to actively enter a mode to add a new database entry. The mode to add a new database entry may store a new face detected in the FOV of the camera 102 in the database and associate incoming audio to the new face.

Figure 8:
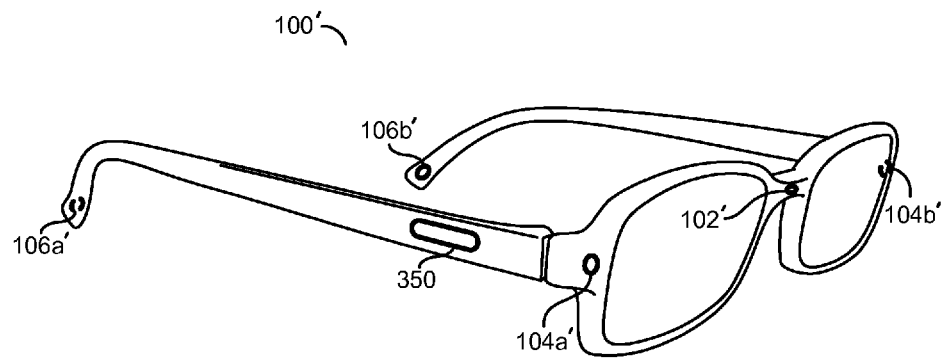
FIG. 8 is a diagram of an alternate embodiment of the device.

Referring to FIG. 8, a block diagram of a device 100' is shown in accordance with an embodiment of the invention. The device 100' comprises a camera 102', the microphones 104a'-104b', the speakers 106a'-106b', and an input 350. In one example, the input 350 may be a button. In another example, the input 350 may be a sensor. The button/sensor 350 may allow the device 100' to activate and/or deactivate various modes on demand. The input 350 is shown on the arm of the device 100'. However, the location of the input 350 may be varied according to the design criteria of a particular implementation.

In an example embodiment where the input 350 is a button, the button 350 may be pressed to activate a calibration mode (to be described in connection with FIG. 10). In another example embodiment where the input 350 is a button, the button 350 may be pressed to activate a person detection mode (to be described in connection with FIG. 11). In yet another example embodiment where the input 350 is a sensor, the sensor 350 may detect a person in the FOV of the camera 102' and activate the person detection mode. In still another example embodiment where the input 350 is a sensor, the sensor 350 may detect the wearer speaking (e.g., by movement of the face of the wearer) and activate the calibration mode.

In an example embodiment, the button 350 may be pressed when a talking person is in the FOV for the camera 102' to actively inform the device 100' of a person of interest. The device 100' may create an entry for the person of interest in the database. The device 100' may detect lip movement and monitor for audio frequencies in a specific range. For example, different audio frequency ranges may be monitored based on the gender, age and/or other characteristics of the face detected.

Figure 9:
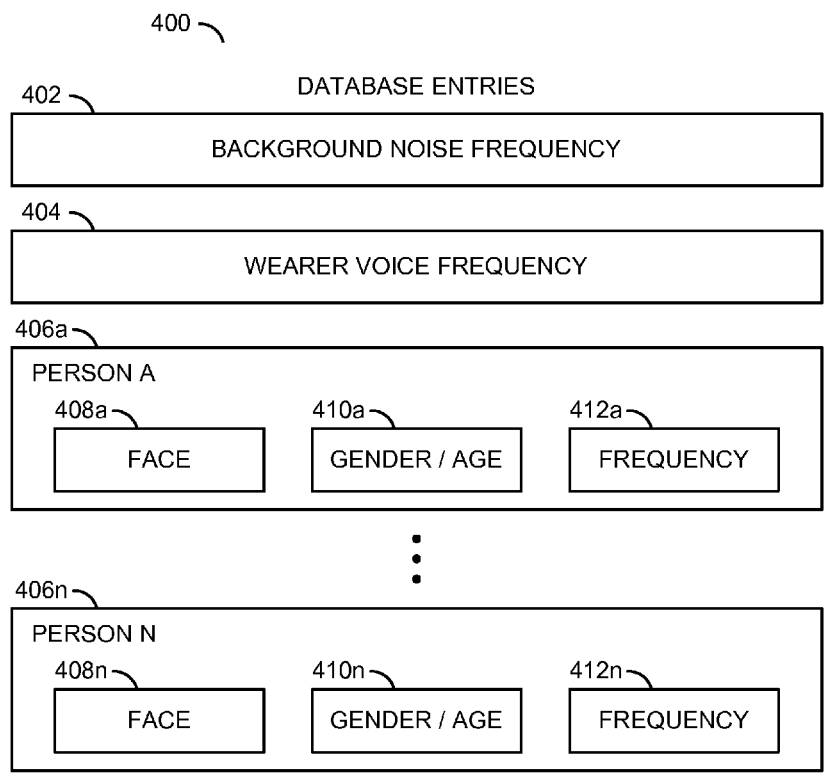
FIG. 9 is a diagram of database entries.

Referring to FIG. 9, a diagram illustrating a database 400 is shown. The database 400 may be stored in the memory 122. The database 400 generally comprises an entry for background noise frequency 402, an entry for wearer voice frequency 404, and person entries 406a-406n. Each of the person entries 406a-406n generally comprises face data 408, gender/age data 410, and frequency data 412. For example, the person entry 406a (e.g., person A) of the database 400 comprises the face data 408a, the gender/age data 410a, and the frequency data 412a.

Generally, the person entries 406a-406n store information for a single person. In one example, the person entries 406a-406n may store entries for when the FOV has multiple faces and/or combined frequencies for multiple people. The device 100 may sort frequencies based on previous matching of faces in the database 400. For example, the device 100 may detect multiple faces in the FOV and recognize one face as the person entry 406a and recognize another face as the person entry 406b. For example, the database 400 may create a new person entry (e.g., 406c) combining data from the person entry 406a and the person entry 406b for when both faces are in the FOV of the camera 102. In another example, the database 400 may create two discrete entries for multiple faces in the FOV. One entry (e.g., 406c) may be when the person recognized as the person entry 406a is talking and the person recognized as the person entry 406b is not talking. The other entry (e.g., 406d) may be when the person recognized as the person entry 406b is talking and the person recognized as the person entry 406a is not talking.

The entry for background noise frequency 402 may comprise of one or more frequencies. For example, the device 100 may detect ambient background noise (e.g., the source 154). The device 100 may actively cancel ambient background noise. The frequencies stored in the entry for background noise frequency 402 may vary based on the location where the device 100 is used. For example, the communication circuit 124 may determine the location of the device 100 (e.g., using GPS information). Based on the location information the entry for background noise frequency 402 may be updated (e.g., a construction site may have a jackhammer background noise signature, a nightclub may have loud music as a background noise signature, a street may have traffic as a background noise signature, etc.). The entry for background noise frequency 402 may need to be updated continually and/or periodically to achieve reliable active noise cancellation. For example, when no talking faces in close proximity are detected by the device 100, the entry for background noise frequency 402 may be refined/updated.

The entry for wearer voice frequency 404 may be comprised of one or more frequencies. Generally, the voice of the wearer of the device 100 does not need to be amplified. For example, the device 100 may disassociate the entry for wearer voice frequency 404 from determining frequencies for the entry for background noise frequency 402, and/or the person entries 406a-406n. In one example, the device 100 may actively cancel frequencies stored in the entry for wearer voice frequency 404. In another example, the device 100 may amplify frequencies stored in the entry for wearer voice frequency 404 (e.g., a situation when the wearer wants to clearly hear his or her own voice). The device 100 may implement a calibration mode to detect the frequencies for the entry for wearer voice frequency 404. For example, in the calibration mode the wearer may speak and the device 100 may associate the audio frequencies with the entry for wearer voice frequency 404.

The face data 408 of the person entries 406a-406n may store a face detected in the FOV of the camera 102. The face data 408 may store information to determine when the mouth/lips of a face are moving. The gender/age data 410 may store the gender/age associated with the face data 408. The gender/age data 410 may determine which audio frequencies to monitor. For example, a typical adult male voice has a fundamental frequency ranging from 85 Hz to 180 Hz and a typical adult female voice has a fundamental frequency ranging from 165 Hz to 255 Hz. In another example, typical voice of a child may have a fundamental frequency ranging from 250 Hz to 300 Hz. The gender/age data 410 may include data relating to any other characteristics of a person that may narrow the frequency range to be sampled by the device 100. Voice detection may be enhanced by sampling a particular range of frequencies based on the gender/age data 410.

The frequency data 412 of the person entries 406a-406n may be comprised of one or more frequencies. The device 100 may sample particular audio frequency ranges based on the gender/age data 410. The frequencies stored in the frequency data 412 may be amplified and/or enhanced by the device 100. The frequencies stored in the frequency data 412 may be continually and/or periodically updated. For example, the device 100 may detect a face matching the face data 408a associated with the person 406a. The face data 408a may be used to determine whether the mouth/lips of the target are moving. When the mouth/lips are moving the device 100 may sample audio frequencies based on the gender/age data 410a. The frequencies detected may be used to continually and/or periodically update/refine the frequency data 412a and/or amplify/enhance the frequencies for playback by the speakers 106a-106b. The continual and/or periodic updates may be at an interval that is fixed and/or variable. For example, the continual and/or periodic updates may be performed at a pre-determined time interval. In another example, the continual and/or periodic updates may be performed after a frequency is detected. The continual and/or periodic updates may be varied to meet the design criteria of a particular implementation.

Figure 10:
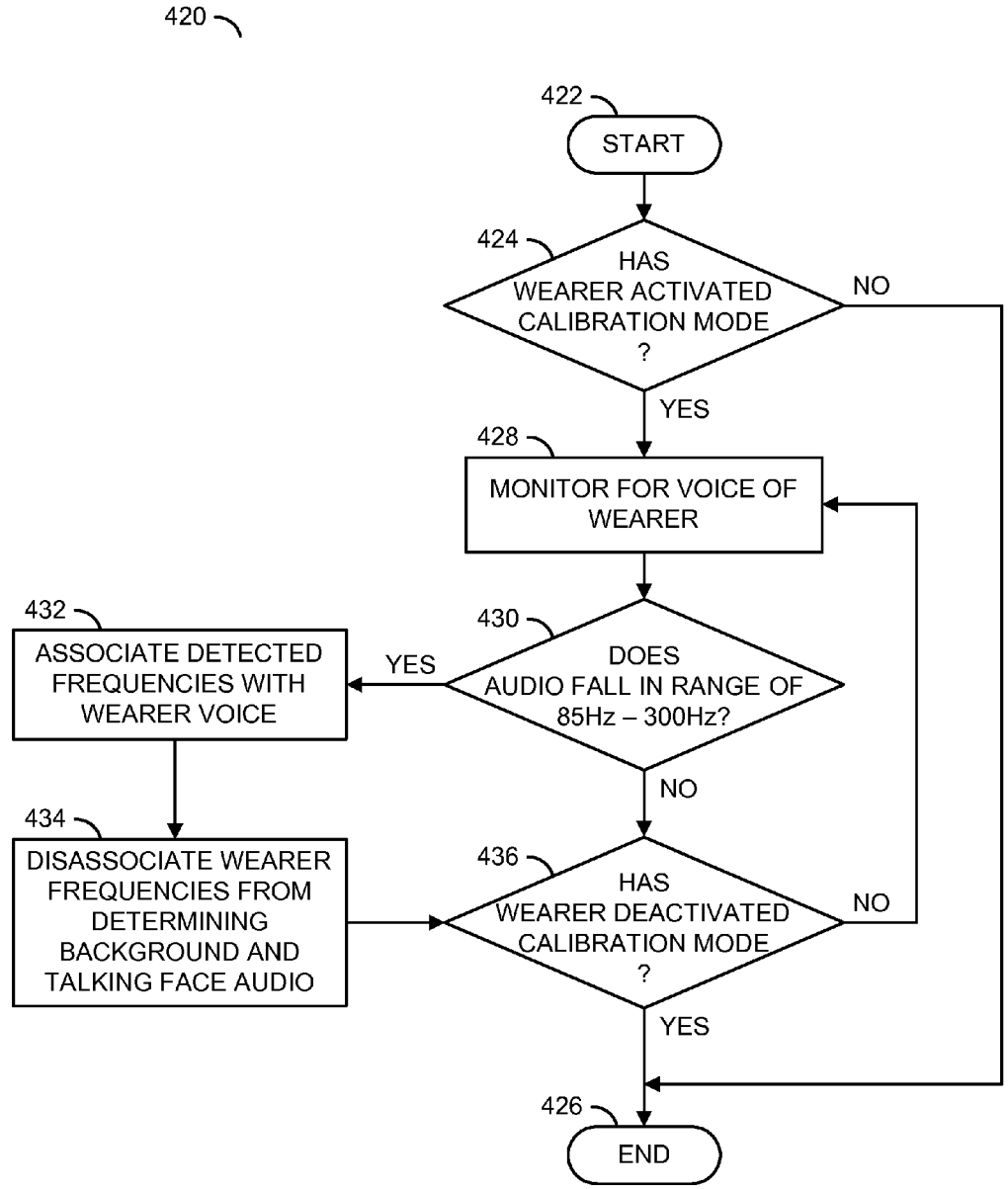
FIG. 10 is a flow diagram illustrating a calibration mode.

Referring to FIG. 10, a flow diagram illustrating a method (or process) 420 is shown. The method 420 may implement a calibration mode. The method 420 generally comprises a step (or state) 422, a decision step (or state) 424, a step (or state) 426, a step (or state) 428, a decision step (or state) 430, a step (or state) 432, a step (or state) 434, and a decision step (or state) 436.

The state 422 may start the method 420. Next, the method 420 moves to the decision state 424. If the decision state 424 determines the wearer has not activated calibration mode, the method 420 moves to the state 426, which ends the method 420. If so, the method 420 moves to the state 428. The state 428 may monitor for the voice of the wearer. Next, the method 428 moves to the decision state 430.

If the decision state 430 determines the audio does fall in the range of 85 Hz-300 Hz (e.g., the typical range of human speech), the method 420 moves to the state 432. If not, the method 420 moves to the decision state 436. The state 432 may associate the detected audio frequencies with the wearer voice (e.g., the entry for wearer voice frequency 404). Next, the state 434 may disassociate the wearer frequencies from determining background and talking face audio (e.g., the entry for background noise frequency 402 and the person entries 406a-406n). Next, the method 420 moves to the decision state 436. If the decision state 436 determines the wearer has not deactivated calibration mode, the method 420 returns to the state 428. If the decision state 436 determines the wearer has deactivated calibration mode, the method 420 moves to the state 426, which ends the method 420. For example, the wearer may deactivate calibration mode by releasing the button 350.

The wearer/user may decide when to enter calibration mode. For example, the wearer may activate calibration mode by pressing the button 350. In another example, the wearer may activate calibration mode by performing a particular sequence of button presses and/or pressing and holding the button 350. Similarly, the wearer may deactivate calibration mode. For example, the wearer may deactivate calibration mode by pressing the button 350 a second time and/or performing a particular sequence of button presses. In another example when the input 350 is a sensor, the device 100 may automatically activate/deactivate calibration mode based on whether the sensor 350 determines the wearer is speaking (e.g., by detecting the movement of the face of the wearer). When the device 100 is in calibration mode, the device 100 may learn the voice of the wearer.

Figure 11:
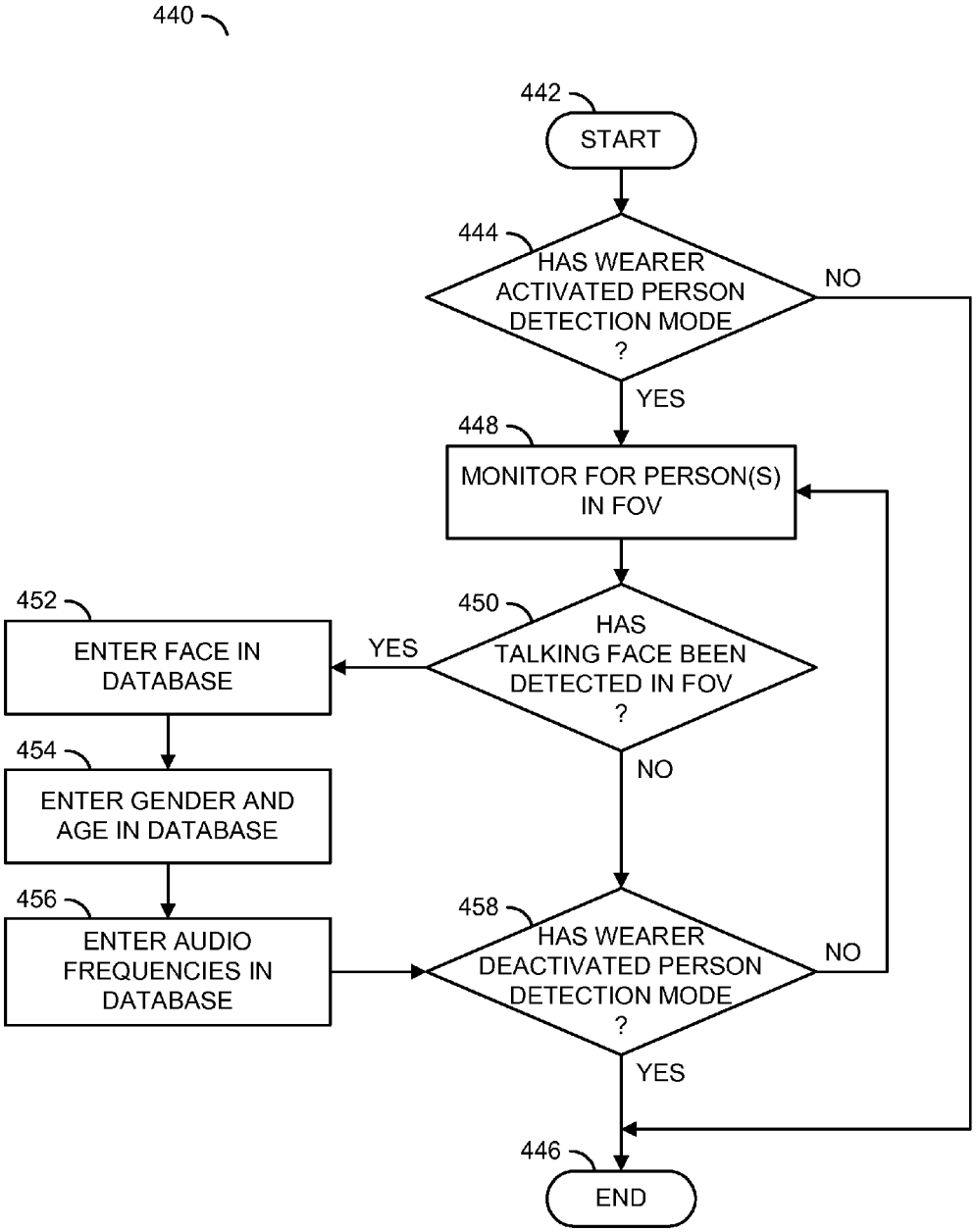
FIG. 11 is a flow diagram illustrating a person detection mode.

Referring to FIG. 11, a flow diagram illustrating a method (or process) 440 is shown. The method 440 may implement a person detection mode. The method 440 generally comprises a step (or state) 442, a decision step (or state) 444, a step (or state) 446, a step (or state) 448, a decision step (or state) 450, a step (or state) 452, a step (or state) 454, a step (or state) 456, and a decision step (or state) 458.

The state 442 may start the method 440. Next, the method 440 moves to the decision state 444. If the decision state 444 determines the wearer has not activated person detection mode, the method 440 moves to the state 446, which ends the method 440. If the decision state 444 determines the wearer has activated person detection mode, the method 440 moves to the state 448. The state 448 may monitor for a person or people in the FOV of the camera 102. Next, the method 440 moves to the decision state 450.

If the decision state 450 determines a talking face has been detected in the FOV of the camera 102, the method 440 moves to the state 452. If not, the method 440 moves to the decision state 458. The state 452 may enter the face in the database 400 (e.g., store the face data 408). Next, the state 454 may enter the gender and age in the database 400 (e.g., the gender/age data 410). The state 456 may enter the audio frequencies in the database 400 (e.g., the frequency data 412). Next, the method 440 moves to the decision state 458. If the decision state 458 determines the wearer has deactivated person detection mode, the method 440 moves to the state 446, which ends the method 440. If not, the method 440 returns to the state 448.

Generally, the device 100 may detect a person and determine whether the person is in the database 400 and/or create a new entry in the database 400 automatically. However, there may be situations when the wearer/user may decide to enter person detection mode. For example, the wearer may activate person detection mode by pressing the button 350. In another example, the wearer may activate person detection mode by performing a particular sequence of button presses and/or pressing and holding the button 350. Similarly, the wearer may deactivate person detection mode. For example, the wearer may deactivate person mode by pressing the button 350 a second time and/or performing a particular sequence of button presses. Generally, the method used to activate/deactivate person detection mode is different than the method used to activate/deactivate calibration mode.

Figure 12:
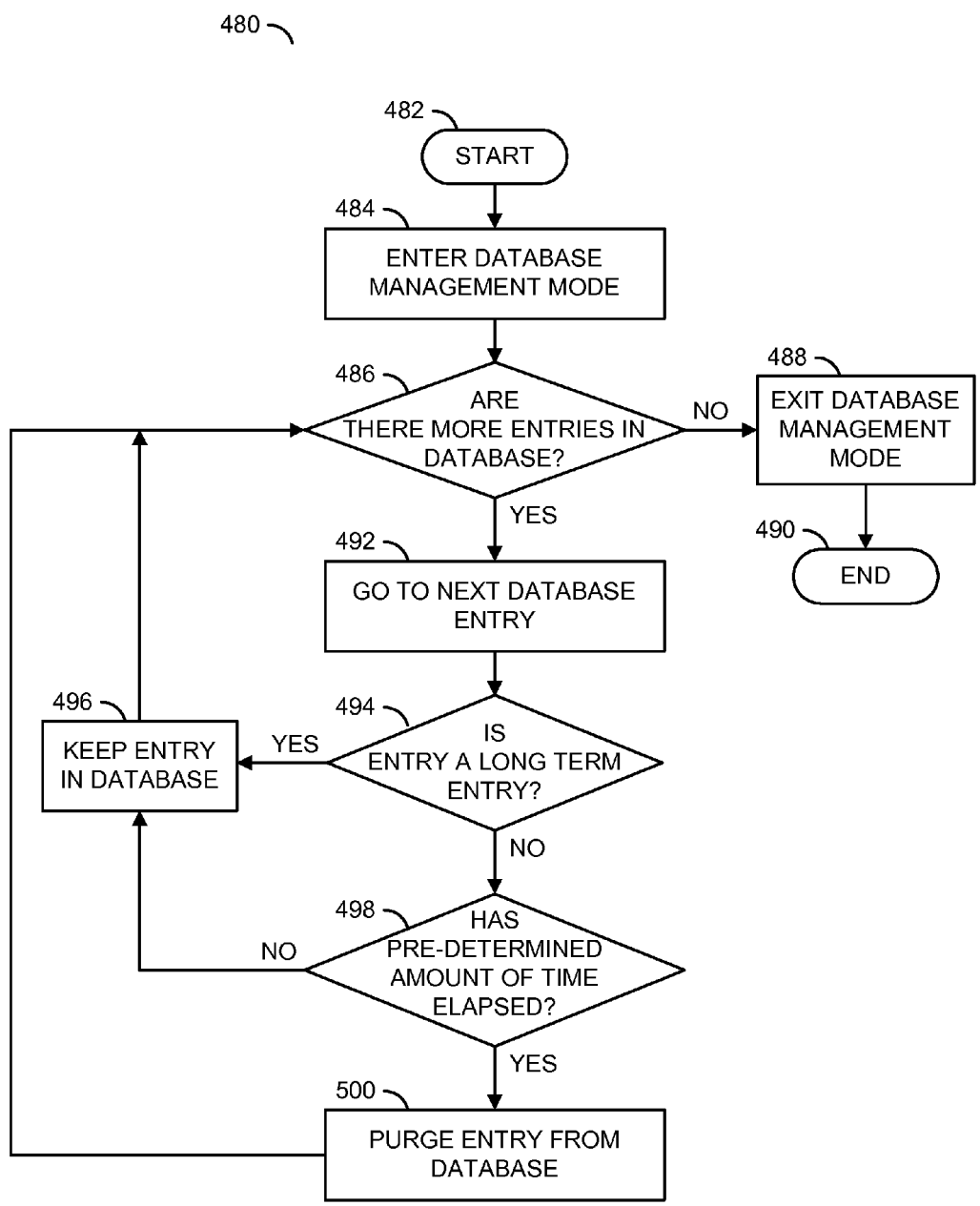
FIG. 12 is a flow diagram illustrating a database management mode.

Referring to FIG. 12, a flow diagram illustrating a method (or process) 480 is shown. The method 480 may implement a database management mode. The method 480 generally comprises a step (or state) 482, a step (or state) 484, a decision step (or state) 486, a step (or state) 488, a step (or state) 490, a step (or state) 492, a decision step (or state) 494, a step (or state) 496, a decision step (or state) 498, and a step (or state) 500.

The state 482 may start the method 480. Next, the state 484 may enter data management mode. Next, the method 480 moves to the decision state 486. If the decision state 486 determines there are not more entries in the database, the method 480 moves to the state 488. The state 488 may exit database management mode. Next, the state 490 may end the method 480. If the decision state 486 determines there are more entries in the database, the method 480 moves to the state 492. The state 492 may go to the next database entry. Next, the method 480 moves to the decision state 494.

If the decision state 494 determines the entry is a long term entry, the method 480 moves to the state 496. The state 496 may keep the entry in the database 400. Next, the method 480 returns to the decision state 486. If the decision state 494 determines the entry is not a long term entry, the method 480 moves to the decision state 498. If the decision state 498 determines a pre-determined amount of time has not elapsed, the method 480 moves to the state 496. If the decision state 498 determines a pre-determined amount of time has elapsed, the method 480 moves to the state 500. The state 500 may purge the entry from the database 400. Next, the method 480 returns to the decision state 486.

The database 400 may have a limited amount of entries. The database management mode may purge entries from the database 400. The purging of the database 400 may be performed after a pre-determined amount of time, activated by the user, and/or activated automatically when the database 400 cannot store more entries. Some of the person entries 406a-406n may be temporary entries. Temporary entries may be purged from the database 400 during database management mode. For example, friends eating dinner at a restaurant may be entries in the database 400, but the entries may not be needed after the dinner is finished. The entries from the dinner may be purged from the database 400. Some of the person entries 406a-406n may be long term entries. For example, family members may be long term entries. Long term entries may not be purged from the database 400 during database management mode.

The entry for background noise frequency 402 may be a temporary entry. Generally, ambient noise is different in different situations and/or locations. For example, the background noise to cancel at a restaurant may be different from the background noise to cancel at a sporting event. Information from the communication circuit 124 may be used to determine the situation and/or location. Generally, the entry for the wearer voice frequency 404 is a long term entry. For example, if the device 100 is used by multiple wearers, each wearer may enter the calibration mode to update the entry for wearer voice frequency 404.

Figure 13:
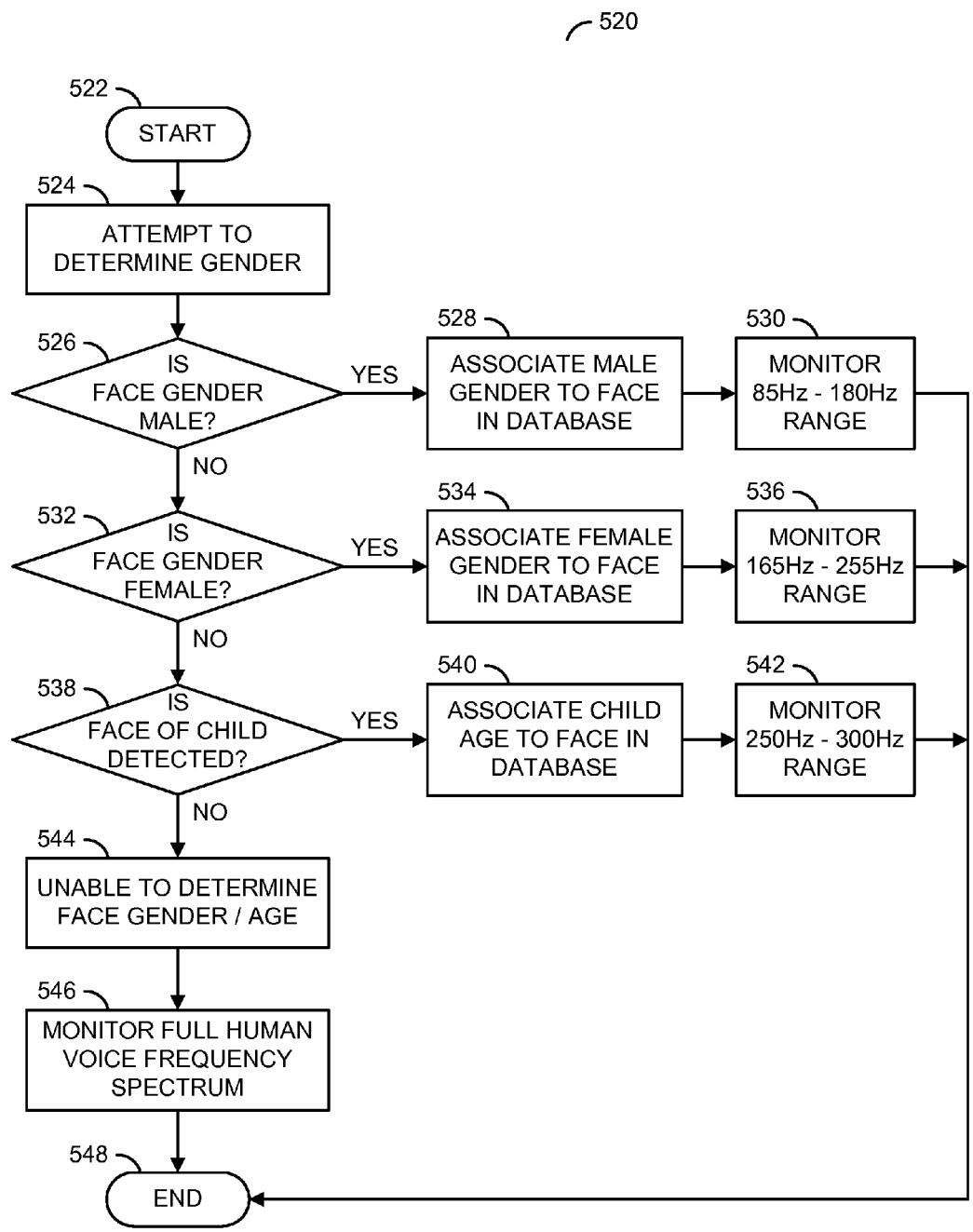
FIG. 13 is a flow diagram illustrating determining a gender and/or age of a target.

Referring to FIG. 13, a flow diagram illustrating a method (or process) 520 is shown. The method 520 may implement determining a gender and/or age of a target (e.g., the gender/age data 410). The method 520 generally comprises a step (or state) 522, a step (or state) 524, a decision step (or state) 526, a step (or state) 528, a step (or state) 530, a decision step (or state) 532, a step (or state) 534, a step (or state) 536, a decision step (or state) 538, a step (or state) 540, a step (or state) 542, a step (or state) 544, a step (or state) 546, and a step (or state) 548. The state 522 may start the method 520. The state 524 may attempt to determine gender (e.g., the gender of a person in the FOV of the camera 102). Next, the method 520 moves to the decision state 526.

If the decision state 526 determines the face gender is male, the method 520 moves to the state 528. The state 528 may associate a male gender to the face in the database (e.g., the gender/age data 410). Next, the state 530 may monitor the 85 Hz-180 Hz range (e.g., to gather data for the frequency data 412). Next, the method 520 moves to the state 548, which ends the method 520. If the decision state 526 determines the face gender is not male, the method 520 moves to the decision state 532.

If the decision state 532 determines the face gender is female, the method 520 moves to the state 534. The state 534 may associate a female gender to the face in the database (e.g., the gender/age data 410). Next, the state 536 may monitor the 165 Hz-255 Hz range (e.g., to gather data for the frequency data 412). Next, the method 520 moves to the state 548, which ends the method 520. If the decision state 532 determines the face gender is not female, the method 520 moves to the decision state 538.

If the decision state 538 determines that the face of a child is detected, the method 520 moves to the state 540. The state 540 may associate a child age to the face in the database (e.g., the gender/age data 410). Next, the state 542 may monitor the 250 Hz-300 Hz range (e.g., to gather data for the frequency data 412). Next, the method 520 moves to the state 548, which ends the method 520.

If the decision state 538 determines the face of a child is not detected, the method 520 moves to the state 544. The state 544 may indicate that the device 100 is unable to determine the face gender/age. Next, the state 546 may monitor the full human voice frequency spectrum (e.g., to gather data for the frequency data 412). Next, the method 520 moves to the state 548, which ends the method 520.

The sequence of the steps shown is an example. Other step orders may be implemented to meet the design criteria of a particular implementation. The decision states 526, 532, and/or 538 may be performed in a different order. For example, the method 520 may first determine whether a face of a child is detected before determining a gender. In another example, the frequency ranges monitored based on the age and/or gender may be different. In yet another example, the method 520 may be comprised of other decision states to determine other characteristics of a face. In some embodiments, the user may select a priority of which characteristics to detect. For example, a supervisor monitoring children may desire having a higher priority for faces of children and the associated audio frequencies (e.g., so the supervisor may hear a child call for help).

The device 100 may attempt to determine the gender, age, and/or other characteristics of a face. The gender, age, and/or other characteristics of a face may be used to narrow the frequency range monitored to associate the face data 408 to the frequency data 412. Generally, the device 100 may not determine an exact age and/or other characteristics of a face. For example, the device 100 may detect an age range of a child and/or a teenager. When an age range of a child is detected, the device 100 may monitor/sample a frequency range of 250 Hz-300 Hz and higher. The other characteristics of a face may be any characteristic that may reduce the amount of sampling by the device 100.

The functions performed by the diagrams of FIGS. 5-7 and 10-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a camera mounted to a first portion of a pair of eyeglasses;
   a microphone mounted to a second portion of said pair of eyeglasses;
   a speaker mounted to said pair of eyeglasses; and
   a processor electronically connected to said camera, said microphone and said speaker, said processor configured to (i) analyze a video signal received from said camera, (ii) determine a target face from a plurality of faces by detecting a movement of lips in said video signal that corresponds to a location of sound isolated by said microphone, (iii) determine a gender of said target face, (iv) monitor audio frequencies received by said microphone associated with (a) a range of audio frequencies associated with said gender and (b) said movement of said lips of said target face, (v) filter sounds from said plurality of faces that are not from said target face, and (vi) play sounds through said speaker that have not been filtered, wherein (a) said range of audio frequencies monitored is narrowed by sampling audio frequencies corresponding to said gender based on characteristics of said target face and (b) said target face is recognized by said processor from a plurality of said faces in a field of view of said camera.

2. The apparatus according to claim 1, wherein said microphone comprises a stereo microphone mounted on two portions of said pair of eyeglasses, configured to isolate a person from other sound sources to locate said target face.

3. The apparatus according to claim 1, wherein said speaker comprises a stereo speaker pair mounted on two portions of said pair of eyeglasses.

4. The apparatus according to claim 1, wherein said processor is further configured to build a database comprising entries of said target faces associated with said audio frequencies.

5. The apparatus according to claim 4, wherein said processor is configured to isolate said audio frequencies associated with said target face when said target face is determined to be talking.

6. The apparatus according to claim 4, wherein said database entries store face data, said gender and age data, and voice frequency data.

7. The apparatus according to claim 4, wherein said database purges said entries of said target faces after a pre-determined amount of time has elapsed.

8. The apparatus according to claim 4, wherein each of said entries of said database are further configured to store a plurality of said target faces.

9. The apparatus according to claim 1, wherein said processor is further configured to cancel ambient noise from said sounds played through said speaker.

10. The apparatus according to claim 9, wherein said ambient noise is sampled when no talking faces are detected by said processor.

11. The apparatus according to claim 1, wherein said processor is further configured to amplify and enhance frequencies of sounds related to said target face.

12. The apparatus according to claim 1, wherein said processor comprises a digital signal processor.

13. The apparatus according to claim 1, further comprising an input, wherein said input activates one or more modes.

14. The apparatus according to claim 13, wherein said modes include at least one of a calibration mode, a person detection mode, and a database management mode.

15. The apparatus according to claim 1, wherein said processor determines said characteristics of said face, said characteristics comprising an age, and other characteristics.

16. The apparatus according to claim 15, wherein said audio frequencies monitored by said processor comprise said range of frequencies narrowed by sampling audio frequencies based on said gender, said age, and said other characteristics of said target face.

17. The apparatus according to claim 1, wherein said processor is further configured to implement a calibration mode to associate detected audio frequencies with a voice of a wearer of said apparatus.

18. The apparatus according to claim 1, wherein said filtered sounds not related to said target face are removed.

19. The apparatus according to claim 1, wherein said video signal is a stereo video configured to determine objects in close proximity by separating said objects in close proximity from a background of said video signal.

20. The apparatus according to claim 1, further comprising a communication circuit configured to (i) determine a location of said apparatus and (ii) present location information based on said location to said processor, wherein said processor cancels background noise based on said location information.

* * * * *